UNITED STATES PATENT OFFICE.

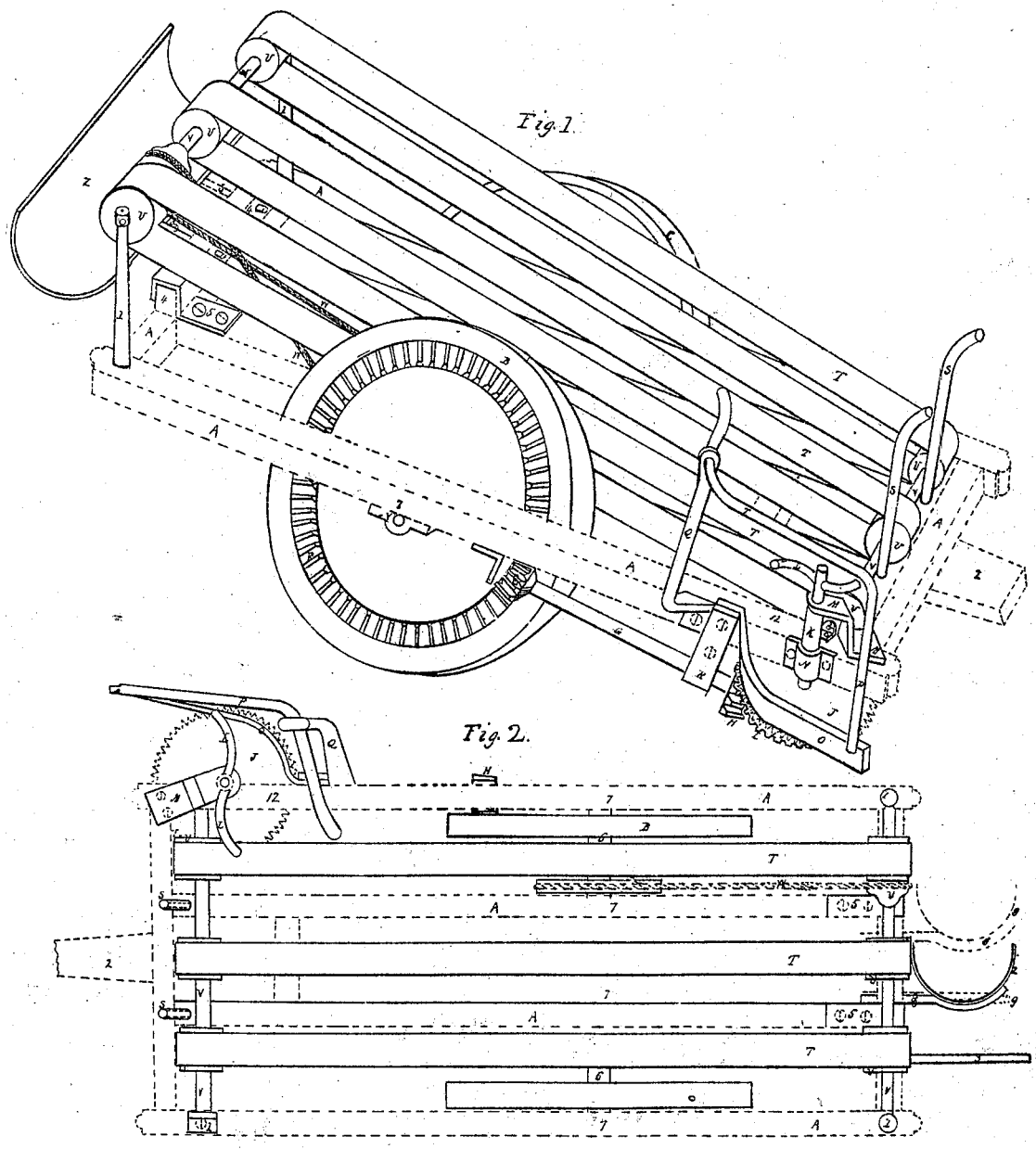

A. STODDARD, OF TECUMSEH, MICHIGAN.

IMPROVEMENT IN CORN-HARVESTERS.

Specification forming part of Letters Patent No. 21,031, dated July 27, 1858.

*To all whom it may concern:*

Be it known that I, ALBERT STODDARD, of Tecumseh, in the county of Lenawee, in the State of Michigan, have invented a new and useful Improvement in Corn-Harvesters; and I do hereby declare that the following is a full and exact description thereof, reference being had to the accompanying drawings, and to the letters of reference marked thereon, making a part of this specification.

Figure 1 represents the several parts of my machine — viz., main frame A, supporting-wheels B and C, master-wheel F, pinion E, shaft G, pinion H, cog-wheel I, saw J, shaft K, reel L, guard P, gatherer O, posts S, posts and boxes indicated by the numerals 1 1 1 1, shafts V V, pulleys U U U U U U, endless belts T T T, endless belt W, hopper Z, its pivot and bar 3, slide 4, cap 5, tongue 2.

Fig. 2 represents my machine from a point of sight directly above the same, exhibiting the parts that are not clearly seen in Fig. 1— viz., the axles 6, band-wheel X, and caps 5.

I will describe the operation of my machine as follows: It is supported by the wheels B and C, their axles 6 being attached to the main frame A by their boxes Y at the numeral 7. When it is drawn on the ground the wheel B gives simultaneous movement to the master-wheel F, that in turn gives rotary motion to the pinion E, shaft G, and pinion H, that in turn give rotary motion to the cog-wheel I, saw J, shaft K, and reel L. The wheel B gives simultaneous movement also to band-wheel X, that in turn gives simultaneous movement to the pulleys U, their shafts V, and endless belts T T T by means of the endless belt W, which passes around the band-wheel X and one of the pulleys U. The machine is drawn between the rows of corn, so as to allow the saw J to approach the standing corn, as indicated by the dotted lines 10. (Seen in Fig. 2.) It cuts the stalks off at a proper height from the ground, the standing stalks being struck at the same time by the reel L, which moves simultaneously with the saw, and is held in contact with the reel by means of the guard P, their butts resting on the saw J at the same time. Thus the stalks are carried around by means of the saw J and reel L until the butts strike the frame A at 12. The motion of the reel then throws the stalks on the endless belts T, and are carried by said belts to the back end of the machine and dropped into the hopper Z. When enough stalks have been cut and carried into the hopper for a bundle or shock the driver then stops the team, ties the stalks, and turns the hopper Z in a vertical position, it being free to revolve on its pivot 8, as seen in Fig. 2, said hopper being attached to the slide 4, and secured to the main frame A by means of the caps 5; said slide being free to slide right and left through the caps 5. Thus when the driver has tied the stalks and turned them up so as to stand erect on the ground, as seen by the dotted lines 9 in Fig. 2, he then takes hold of the bar 3, said bar being also attached to slide 4, and moves the hopper to the left enough to allow the hopper to pass the shock, as seen by the end view of the hopper Z in Fig. 2. He then drives on, leaving the shock standing on the ground, and slides the hopper back to the dotted lines 9 and turns it down until it strikes the bar 3, that brings it in a horizontal position, as seen in Fig. 1, ready to receive another bundle.

I do not claim being the first inventor of a corn-harvester, nor do I claim the parts of my machine separately; but—

What I do claim, and desire to secure by Letters Patent, is—

The combination, with the main frame A, of the pinion E, shaft G, pinion H, cog-wheel I, saw J, shaft K, reel L, guard P, wheel X, belt W, shafts V V, their pulleys U U U U U U, endless belts T T T, hopper Z, its pivot and slide 4, bar 3, and caps 5, when these several parts are arranged as and for the purposes set forth.

ALBERT STODDARD.

Witnesses:
 M. SMITH,
 D. C. SMITH.